H. ATKINSON.
SELF LUBRICATING WHEEL.
APPLICATION FILED NOV. 8, 1907.
901,866.
Patented Oct. 20, 1908.
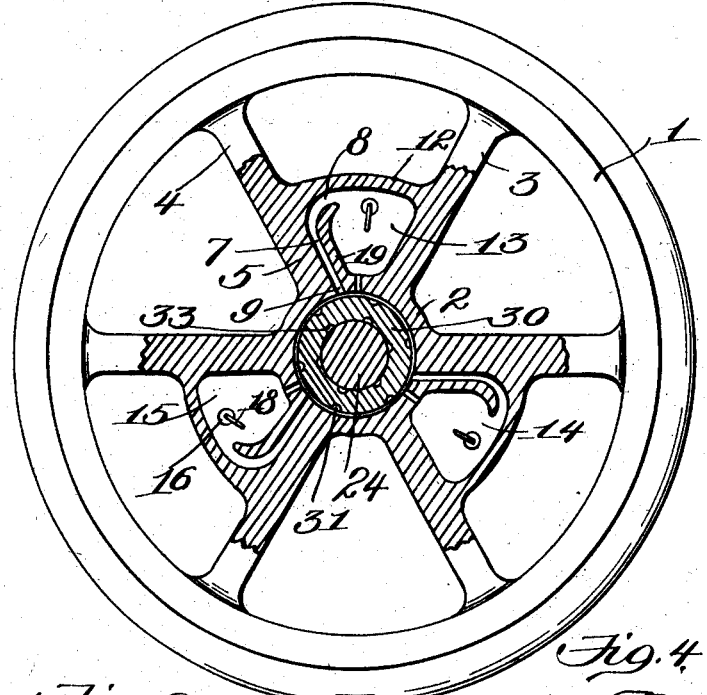
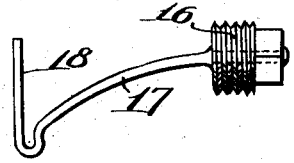
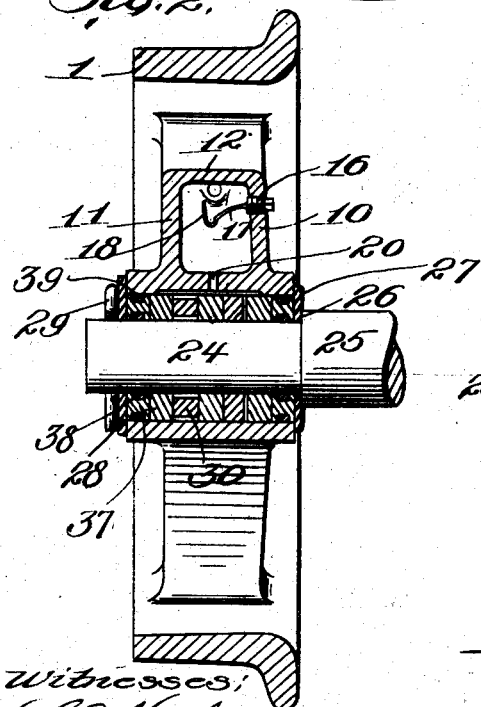
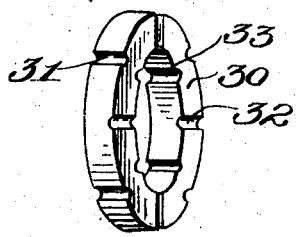
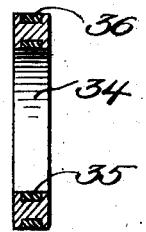
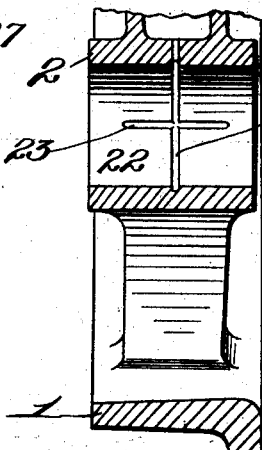
Witnesses:
Inventor
Howard Atkinson
By James L. Norris
Atty.

UNITED STATES PATENT OFFICE.

HOWARD ATKINSON, OF CHARLESTON, WEST VIRGINIA.

SELF-LUBRICATING WHEEL.

No. 901,866.　　　　Specification of Letters Patent.　　　Patented Oct. 20, 1908.

Application filed November 8, 1907. Serial No. 401,336.

*To all whom it may concern:*

Be it known that I, HOWARD ATKINSON, a citizen of the United States, residing at Charleston, in the county of Kanawha and State of West Virginia, have invented new and useful Improvements in Self-Lubricating Wheels, of which the following is a specification.

This invention relates to self lubricating wheels, adapted for use in connection with mine cars or for other purposes wherein the wheel is found applicable; and one of the objects thereof is to provide a self-lubricating wheel in a manner as hereinafter set forth, whereby a constant circulation of lubricant is maintained to thoroughly lubricate all parts of the bearings when centrifugal force throws the lubricant within the lubricant chambers towards the outside of the hub and away from the axle when the wheel is revolving rapidly; furthermore to provide a self-lubricating wheel with means in a manner as hereinafter set forth which will prevent leakage when the wheel is rapidly revolving.

A further object of the invention is to provide a self-lubricating wheel in a manner as hereinafter set forth with means whereby a thorough lubrication in the bearing parts will be had, whether the wheel is revolving or stationary, and at the same time loss of the lubricant will be prevented.

Further objects of the invention are to provide a self-lubricating wheel which shall be simple in its construction, strong, durable, efficient in its use, readily set up, easily replenished with lubricant when occasion so requires, and comparatively inexpensive to manufacture.

With the foregoing and other objects in view, the invention consists in the novel combination, construction and arrangement of parts hereinafter more specifically described, and illustrated in the accompanying drawings, wherein is shown the preferred embodiment of the invention, but it is to be understood that changes, variations and modifications can be resorted to which come within the scope of the claims hereunto appended.

In the accompanying drawings, wherein like characters denote corresponding parts throughout the several views—Figure 1 is a sectional side elevation of a self-lubricating wheel in accordance with this invention. Fig. 2 is a vertical sectional view. Fig. 3 is a vertical sectional view broken away, illustrating the grooved inner face of the hub. Fig. 4 is a perspective view of one of the bearing rings. Fig. 5 is a vertical sectional view of one of the guard rings. Fig. 6 is a perspective view of the closure cap for the lubricant chambers.

Referring to the drawings in detail, 1 denotes the wheel rim, and 2 the hub, the latter being connected to the former by a series of spokes, certain of the spokes being indicated by the reference character 3, and the others by the reference character 4. The spokes 4 have the inner portions thereof of greater width than the outer portions, as at 5, and the inner part 19 of each of the enlarged portions of the spokes 4 is provided with a channel 7 having a curvilinear outer end 8 and also having its inner end communicating with a port 9 formed in the hub 2. The space between every alternate pair of spokes is bridged by the walls 10, 11 and 12, which are cast integral with the spokes and the hub 2 and form, in connection with the spokes and hub 2, a plurality of lubricant chambers 13, 14 and 15, the curved ends 8 of the channels 7 communicating with the said chambers. The length of the walls 10 and 11 is approximately half of that of the spokes and the wall 12 is positioned at a point intermediate the ends of the spokes so that a space will be formed between the walls 12 and the rim. Each of the walls 10 is formed with a screw-threaded opening to receive a closure plug or cap 16 which is carried by a spring arm 17 having an angular end 18. The function of the spring arm 17 is to connect the plug or cap 16 to the wall 10 when the plug or cap 16 is removed from the opening when replenishing the chamber with lubricant. This is evident owing to the fact that if the plug or cap 16 is removed from its opening the angular end 18 will prevent the arm 17 from being withdrawn entirely from the chamber.

Although as shown the wheel is provided with three lubricant chambers, yet it is evident that the number of such chambers can be increased or diminished if required, but preferably three will be employed.

The hub 2 is not only provided with a port or channel 9 which communicates with the channel 7, but is also formed with a plurality of ports 20 which open at one end in the lubricant chambers and at their other end into an annular groove 21 formed in the inner face 22 of the hub 2. The inner face of the hub 2 is furthermore provided with a longitudinally-extending groove 23 of a length as to terminate from each end of the hub, the said groove 23 intersecting the annular groove 21, the groove 23 being so disposed with respect to the groove 21 that the length of that portion of the groove 23 which projects from each side of the groove 21 will be the same. Extending from the hub 2 is the spindle 24 of less diameter than the axle 25, thereby forming a shoulder 26 between which and the inner end of the hub is positioned a flat annular member 27 constituting a retaining ring. Mounted against the outer end of the hub 2 is a flat annular member 28 of greater diameter than the member 27 and which also constitutes a retaining ring. The retaining rings 27, 28 are mounted upon the spindle 24. Extending through the outer end of the spindle 24 and bearing against the retaining ring 28 is a cotter pin 29 which secures, in connection with the ring 28, the wheel upon the spindle 24. The hub 2 is of much greater diameter than the spindle 24, and interposed between the hub and the spindle is a series of combined lubricating and bearing rings 30 which are of such diameter as to extend in close proximity to the inner face of the hub and have the inner diameter thereof such as to enable the inner face of the rings to extend in close proximity to the spindle 24, but the inner and outer diameters of the rings 30 are such as to allow of the rings 30 having a rotative movement independent of the rotative movement of the wheel. Each of the rings 30 has the periphery thereof formed with a plurality of transversely-extending grooves 31 disposed throughout the circumference of the ring. The grooves 31 constitute lubricant-receiving pockets. Each of the rings 30 is furthermore provided on one side with a series of radial grooves 32 extending from the inner edge to the outer edge of the ring. The grooves 32 also constitute lubricant-receiving pockets. The inner face of each of the rings 31 is formed with a series of transversely-extending grooves 33 which also constitute lubricant-receiving pockets. As shown, five combined lubricating and bearing rings surround the axle spindle 24, but it is evident that the number of such rings can be increased or diminished as desired, but the length of the longitudinally-extending grooves 23 formed in the inner face of the hub 2 must be such as to extend over each of the outer rings of the series as clearly shown in Fig. 2, the grooves 23 constituting means for supplying lubricant to the periphery of the rings 30. Mounted upon the inner end of the spindle 24, between the ring 27 and the ring 30 is a packing ring 34 having its inner face formed with an annular pocket in which is mounted a suitable packing material 35. The periphery of the ring 34 is also provided with an annular pocket in which is mounted a suitable packing material 36. The packing 35 bears against the spindle 24 and the packing 36 against the inner face of the hub 2. The function of the packing 35 and 36 is to form a guard to prevent leakage and entrance of dust. Interposed between the ring 28 and the outer ring 30 is a ring 37 having its inner and outer faces formed with an annular pocket to receive the packing 38, 39, respectively. The function of the packing 38, 39 is the same as that set forth in connection with the packing 35—36, so under such circumstances a guard is set up at the outer and inner ends of the hub to prevent leakage, as well as the entrance of dust.

The inner end of each of the ports or channels 9 communicates with the groove 21 and the function of the passage 7 is to supply the lubricant to the bearing parts when the wheel starts to move. During the rotation of the wheel centrifugal force will throw the lubricant outwardly, that is to say away from the hub and part of the lubricant will enter the curved end 8 of the passage 7 and consequently the lubricant will be forced down the passage under pressure owing to the action of centrifugal force upon the lubricant within the chambers. During the rotation of the wheel a circulation of the lubricant will be had owing to the fact that one or more of the ports 20 will extend vertically or be upwardly inclined and one or more of the ports 20 will depend or be downwardly inclined, consequently, as the lubricant is supplied to lubricate the bearing parts through one or more of the ports 20 it will be discharged into a chamber or chambers through the remaining port or ports 20. From the construction set forth it is evident that when the wheel is stationary the bearing parts will be thoroughly lubricated without any waste of material.

The rings 30 revolve freely around the spindle 24 and the construction of the rings with respect to each other allows the lubricant to percolate between the bearing faces of the rings and against the hub and the spindle. Each of the rings 30 revolves independently around the axle and the hub revolves around the rings. Retaining the wheel upon the axle through the medium of the cotter pin and ring or washer 28 enables the wheel to meet the many conditions of the mine and avoids the rigidity of the recessed axle and keyed wheel. With the two motions of ring bearings and hub movement the wear over all is uniform and with the hub and axle hardened to a degree above the rings 30, only these latter require replacing at extended intervals.

From the foregoing construction of self-lubricating wheel it is evident that one is set up wherein the bearing parts will be thoroughly lubricated without any waste of lubricating material and without sacrificing any of the bearing surfaces. Furthermore the wheel is simple in construction, capable of the hardest service and combines all the advantages of a revolving and non-revolving axle with none of their disadvantages; and furthermore, owing to the manner in which the wheel is set up it obtains the advantage of a light running wheel without the employing of ball or roller bearings.

What I claim is—

1. A self-lubricating wheel embodying a hub, a plurality of grooved rings secured within said hub, a plurality of lubricating chambers interposed between the spokes of the wheel, and means whereby a circulation of the lubricant will be had through the said rings and from chamber to chamber.

2. A self-lubricating wheel embodying a hub, a plurality of grooved rings secured within said hub, a plurality of lubricating chambers interposed between the spokes of the wheel, and means whereby a circulation of the lubricant will be had through the said rings and from chamber to chamber, said rings capable of an independent rotative movement with respect to each other and with respect to the wheel.

3. A self-lubricating wheel embodyi g a grooved hub, means for providing said wheel with a plurality of lubricating chambers, said hub provided with ports for establishing communication between said chambers and the interior of the hub, and means for conducting lubricant from the outer ends of said chambers to the interior of the hub, said means independent of said ports.

4. A self-lubricating wheel embodying a grooved hub, means for providing said wheel with a plurality of lubricating chambers, said hub provided with ports for establishing communication between said chambers and the interior of the hub, means for conducting lubricant from the outer ends of said chambers to the interior of the hub, said means independent of said ports, and a plurality of grooved bearing rings retained within the said hub, said rings providing means for lubricating the inner face of the hub and the axle spindle.

5. A self-lubricating wheel embodying a grooved hub, means for providing said wheel with a plurality of lubricating chambers, said hub provided with ports for establishing communication between said chambers and the interior of the hub, means for conducting lubricant from the outer ends of said chambers to the interior of the hub, said means independent of said ports, and a plurality of grooved bearing rings retained within the said hub, said rings providing means for lubricating the inner face of the hub and the axle spindle, said rings capable of an independent rotative movement with respect to each other and with respect to said wheel.

6. A self-lubricating wheel embodying a grooved hub, means for providing said wheel with a plurality of lubricating chambers, said hub provided with ports for establishing communication between said chambers and the interior of the hub, means for conducting lubricant from the outer ends of said chambers to the interior of the hub, said means independent of said ports, a plurality of grooved bearing rings retained within the said hub, said rings providing means for lubricating the inner face of the hub and the axle spindle, a guard mounted at each end of the hub, said guards constituting means for retaining the rings in position, combined with means for maintaining the guards in position.

7. A self-lubricating wheel embodying a rim, a hub, spokes connecting the hub to the rim, means formed integral with certain of the spokes for providing, in connection with the spokes and hub, lubricating chambers, said hub provided with ports for establishing communication between said chambers and the interior of the hub, and means for conducting a lubricant from the outer ends of said chambers to the interior of the hub, said means independent of said ports, combined with an axle spindle, grooved rings interposed between the spindle and the hub, and provided with means whereby a lubricant can be supplied to the inner faces of the rings and said spindle, a dust guard mounted within the hub at each end thereof, and maintaining the rings in position, annular retaining members mounted against the dust guards, and a cotter pin extending through the spindle and engaging one of said annular retaining members.

8. A self-lubricating wheel embodying a rim, a hub, spokes connecting the hub to the rim, means formed integral with certain of the spokes for providing, in connection with the spokes and hub, lubricating chambers, said hub provided with ports for establishing communication between said chambers and the interior of the hub, means for conducting a lubricant from the outer ends of said chambers to the interior of the hub, said means independent of said ports, combined with an axle spindle, grooved rings interposed between the spindle and the hub, and provided with means whereby a lubricant can be supplied to the inner faces of the rings and said spindle, a dust guard mounted within the hub at each end thereof, and maintaining the rings in position, annular retaining members mounted against the dust guards, and a cotter pin extending through the spindle and engaging one of said annular retaining members, said rings capable of rotative movement independent with respect to each other and with respect to said hub.

In testimony whereof I have hereunto set my hand in presence of two subscribing witnesses.

HOWARD ATKINSON.

Witnesses:
WALLER C. HARDY,
S. B. AVIS.